(12) United States Patent
Araki et al.

(10) Patent No.: US 7,828,362 B2
(45) Date of Patent: Nov. 9, 2010

(54) ROOF RETRACTABLE TYPE VEHICLE

(75) Inventors: Minoru Araki, Hamamatsu (JP);
Takayuki Souma, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 436 days.

(21) Appl. No.: 11/999,146

(22) Filed: Dec. 4, 2007

(65) Prior Publication Data

US 2008/0129076 A1 Jun. 5, 2008

(30) Foreign Application Priority Data

Dec. 5, 2006 (JP) ............................. 2006-328312

(51) Int. Cl.
*B60J 7/20* (2006.01)
(52) U.S. Cl. ................................. 296/107.08
(58) Field of Classification Search ............ 296/107.08, 296/136.05, 136.06, 136.01, 136.03, 107.01, 296/24.44, 121
See application file for complete search history.

(56) References Cited

U.S. PATENT DOCUMENTS

| | | | |
|---|---|---|---|
| 7,077,455 B2 * | 7/2006 | Guillez et al. ......... | 296/107.08 |
| 7,322,635 B2 * | 1/2008 | Kuttner et al. ........ | 296/107.08 |
| 7,419,200 B2 * | 9/2008 | Queveau et al. ....... | 296/24.44 |
| 7,497,500 B2 * | 3/2009 | Roeder et al. ......... | 296/136.05 |
| 2007/0182200 A1 * | 8/2007 | Baumeier et al. ...... | 296/107.08 |
| 2010/0038927 A1 * | 2/2010 | Wegener et al. ....... | 296/107.08 |

FOREIGN PATENT DOCUMENTS

| | | |
|---|---|---|
| JP | 2795433 B2 | 6/1989 |
| JP | 2-47050 Y2 | 11/1990 |
| JP | 3349231 B2 | 6/1995 |
| JP | 2000-103288 A | 4/2000 |
| JP | 2001-239838 A | 9/2001 |
| JP | 2004-291696 A | 10/2004 |
| JP | 2005-231460 A | 9/2005 |
| JP | 2005-254912 A | 9/2005 |
| JP | 2006-015893 A | 1/2006 |

* cited by examiner

*Primary Examiner*—Hilary Gutman
(74) *Attorney, Agent, or Firm*—Alston & Bird LLP (57) ABSTRACT

In a roof retractable type vehicle including a roof storage area, a roof storage mechanism for storing a roof, and a tonneau cover for opening and closing the roof storage area, the tonneau cover is connected to the vehicle body side via a mechanism in which the front end of the tonneau cover moves frontward and upward from the closed position and the rear end of the tonneau cover moves frontward, and the tonneau cover is retracted in an inclined posture to the front of the roof storage area. The tonneau cover includes a central member positioned in the center in the vehicle width direction and side members adjacent to both sides of the central member, and the side members and are connected swingably to the central member so that the side members can be retracted to the center side in the vehicle width direction.

6 Claims, 9 Drawing Sheets

ROOF RETRACTABLE TYPE VEHICLE

CROSS REFERENCE TO RELATED APPLICATIONS

This application claims the benefit of Japanese Patent Application No. 2006-328312, filed Dec. 5, 2006, which is incorporated herein by reference in its entirety and for all purposes.

FIELD OF THE INVENTION

The present invention relates to a roof retractable type vehicle in which a roof can be stored in a vehicle body to form an open-top state. More particularly, it relates to a roof retractable type vehicle provided with a tonneau cover for opening and closing a roof storage area defined at the rear of a seat.

BACKGROUND OF THE INVENTION

Roof retractable type vehicles in which a roof can be stored in a vehicle body to form an open-top state are of two types: a hard-top type in which the roof is stored in the vehicle body by being divided and a soft-top type in which the roof is stored by being folded. In a vehicle of this type, a tonneau cover is used for closing a roof storage area at the rear of a seat both when an open-top state is formed by storing the roof and when a closed-top state is formed by spreading out the roof.

As the tonneau cover, a manual tonneau cover of a detachable type or a roll type that is opened and closed by a manual operation (for example, refer to JP 2005-254912 A), an automatic tonneau cover that is driven in association with a roof storage mechanism, or the like is used. The manual tonneau cover has problems of low operability, bad appearance, and the like. As the automatic tonneau cover, a type in which a vehicle that stores the roof in a trunk is equipped with a tonneau cover system mounted on a trunk lid, and a tonneau cover appears from the raised trunk lid, a type in which a special-purpose lid is provided, a type in which separate covers appear when the roof is opened and closed (refer to JP 2004-291696 A), a type in which the cover is slid along a slide rail by being folded around the axis in the vehicle width direction (refer to JP 2005-231460 A and JP 2006-015893 A), and the like are publicly known. The automatic tonneau covers of all of these types have a problem in that the construction is complicated and a large number of parts are needed, which requires a high manufacturing cost. Further, the automatic tonneau covers of all of these types also have a problem in that a large-scale driving mechanism is required and therefore a dead space increases.

BRIEF SUMMARY OF THE INVENTION

The present invention has been made in view of the above circumstances, and accordingly an object thereof is to provide a roof retractable type vehicle in which the construction and operation of a tonneau cover opening/closing mechanism are simple, the displacement at the opening/closing time is small, the installation space for a driving mechanism is small, and in addition, the manufacturing cost can be reduced.

To achieve the above object, a roof retractable type vehicle in accordance with the present invention includes a roof storage area defined at the rear of a seat; a roof storage mechanism for storing a roof in the roof storage area; and a tonneau cover for opening and closing the upper part of the roof storage area. The configuration is made such that the tonneau cover is connected to the vehicle body side via a mechanism, and by the operation in which the front end of the tonneau cover moves frontward and upward from the closed position and the rear end of the tonneau cover moves frontward, the tonneau cover is retracted in an inclined posture to the front of the closed position to open the upper part of the roof storage area.

By the above-described configuration, the tonneau cover is retracted in the inclined posture along the movement path of the roof, by which the interference with the roof can be prevented surely with a small displacement, and an opening/closing region that is large in relation to the displacement can be obtained. Although the front end of the tonneau cover moves to the passenger compartment space side, the projection amount into the passenger compartment space is small because the front end of the tonneau cover moves upward, so that the influence on the comfort can be kept to a minimum. Further, by the operation in which the rear end of the tonneau cover moves in the vehicle front and rear direction, and is in contact with the roof rear surface (back window) when the roof is closed and is in contact with the opening edge part of the roof storage area in the roof storage state, good sealing can be ensured in both cases.

In a preferred mode of the present invention, the tonneau cover includes a central member positioned in the center in the vehicle width direction and side members adjacent to both sides of the central member; the central member is connected to the vehicle body side via a mechanism; and the side members are connected turnably or slidably to the central member, so that the side members can be retracted to the center side in the vehicle width direction. Therefore, the movement path of the side surface part of a link and the roof forming the roof storage mechanism is secured, so that the tonneau cover can be retracted from the roof movement path rapidly and surely with a further small displacement. Also, the operation in which the side member is brought into contact with the opening edge part at the vehicle side of the roof storage area can be performed, so that good sealing can be ensured at the side of vehicle.

In a mode in which the side members of the tonneau cover are turnably connected to the central member along a division line, and the turning axis is disposed slantwise so that the front end in the vehicle front and rear direction is positioned on the vehicle center side of the rear end, the width on the upper end side of the central member decreases in the inclined posture at the time when the tonneau cover is retracted from the closed position, and the tonneau cover can be retracted from the roof movement path along the general roof inner surface shape with a small displacement.

Also, in the case where the tip end of the side member of the tonneau cover is extended to the front of vehicle in relation to the central member to define the swingable range of the roof storage mechanism provided in both side parts in the vehicle width direction, the tip end position of the side member is lowered by the inclination of the side member, by which the tonneau cover can be retracted from the roof movement path.

At this time, whereas the vehicle front side position of the tip end of the side member lowers, the vehicle rear side of the tip end of the side member is close to the pivot axis, and the lowering amount is small. Therefore, in the early stage of opening operation of the tonneau cover, in the state in which the inclination angle of the central member is small, the retraction of the side member can be started. This is advantageous in the case where the side member is interlocked to the central member via a mechanism.

In a mode in which the central member of the tonneau cover is swingably connected to the vehicle body side via links at two positions separated in the vehicle front and rear direction; the front and rear links on each side and the central member form a four link mechanism in which the vehicle body side is a fixed link; and a pivot axis on the vehicle body side of the front link is disposed at a position higher than a pivot axis on the vehicle body side of the rear link, the opening and closing of the tonneau cover can be performed lightly by a deciding operation.

In a mode in which each of the side members of the tonneau cover is connected to the front link or the vehicle body side via a connecting member, and the side member is retracted to the center side in the vehicle width direction by the movement of the tonneau cover from the closed position to an open position, the side member can be retracted at proper timing in association with the movement of the central member without the need for a separate driving source.

Also, in a mode in which the tonneau cover includes an urging member for urging the side member in the retracting direction and the opposite direction thereto with respect to the central member and a regulating means for regulating the turning range of the side member against the urging force of the urging member, the side member can be straightened by the urging force of the urging member when the tonneau cover is restored from the open position to the closed position, and the connecting member of the side member is subjected to only a tensile force, so that the connecting member can be simplified and the weight thereof can be reduced. Also, unnecessary vibration of the side member at the time of storage operation can be prevented.

Further, in a mode in which a frame structure extendingly provided in the vehicle width direction between the seat and the roof storage area is provided, and a driving means for moving the tonneau cover between the closed position and the open position is disposed in a central part in the vehicle width direction of the frame structure, the rigidity of vehicle body is improved, and the safety and drivability of an open-roof type vehicle can be improved. Also, since the driving means is disposed in a highly rigid portion close to the tonneau cover, the tonneau cover can be driven efficiently, and a driving force transmitting mechanism can be made small in size and can be simplified. Also, since the central part of the rear seat generally consisting of two seats can be expanded to the front side of vehicle as compared with the portion of each seat, the driving means can be disposed with a spatial margin being provided.

DETAILED DESCRIPTION OF THE INVENTION

An embodiment of the present invention will now be described in detail with reference to the accompanying drawings.

Figure 1:
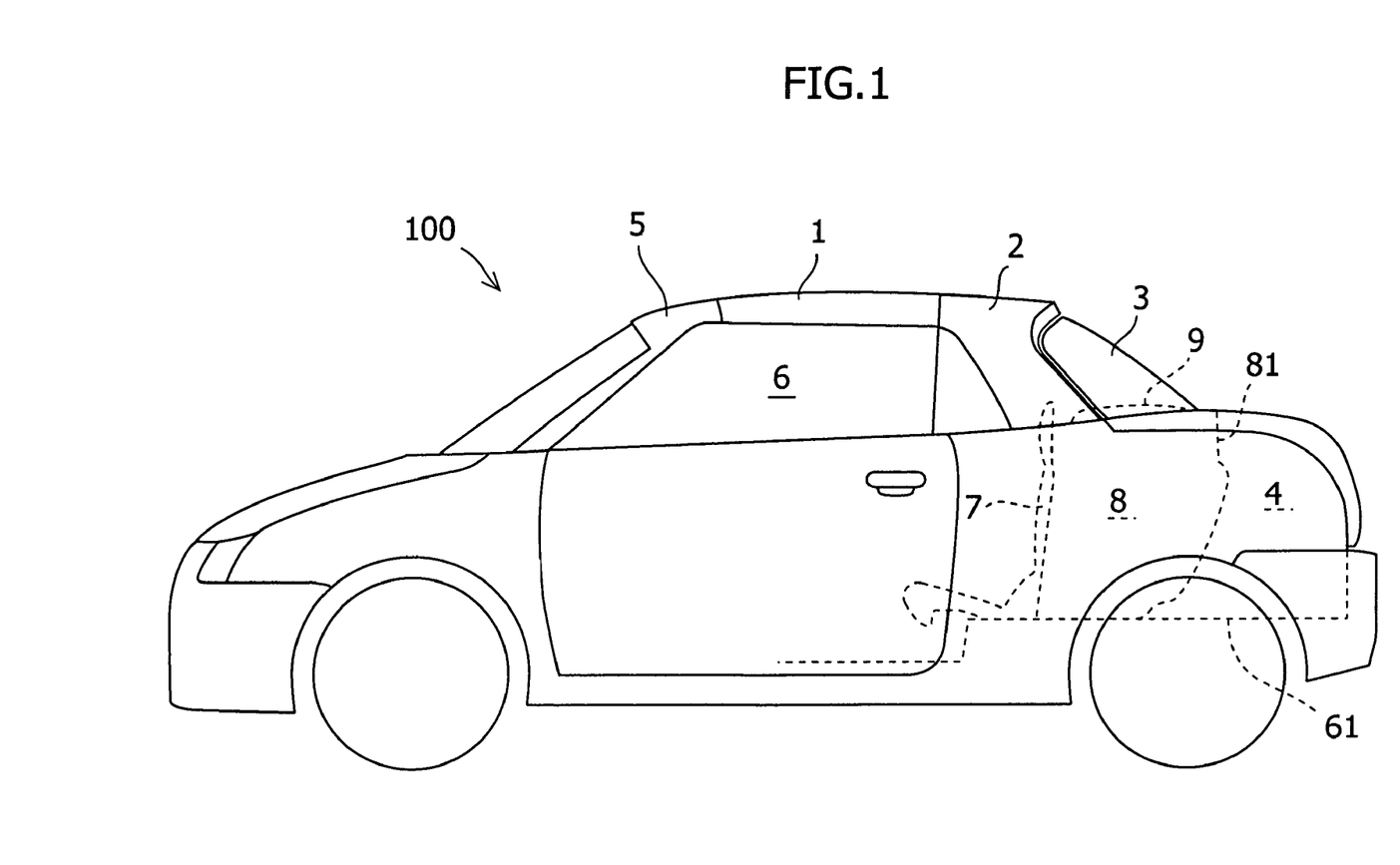
FIG. 1 is a side view of a roof retractable type vehicle in accordance with an embodiment of the present invention.

FIG. 1 is a side view showing an appearance of a roof retractable type vehicle in accordance with an embodiment of the present invention. In FIG. 1, a roof retractable type vehicle 100 can form an open-top state by dividing a roof formed by a substantially undeformable member into a center roof section 1 positioned at the rear of a front window frame 5, a rear roof section 2 positioned at the rear of the center roof section 1, and a back window section 3 and by storing the roof in a roof storage area 8 in a vehicle body by using a roof storage mechanism.

The roof storage area 8 is defined between a rear seat 7 and a luggage compartment 4 positioned at the rear of the rear seat 7, and the roof storage area 8 and the luggage compartment 4 are divided from each other by a cabin back panel 81. The lower surface of the roof storage area 8 is defined by a floor panel 61. In the state in which the roof is closed, in an upper part of the roof storage area 8 positioned in a passenger compartment 6, a tonneau cover 9, described later, is provided so as to be openable and closable. The tonneau cover 9 is configured so as to be opened at the roof storage time and the roof spread time to allow the sections of the roof to go in and out and to be capable of closing the roof storage area 8 in the roof closed state and the roof open state.

Figure 2:
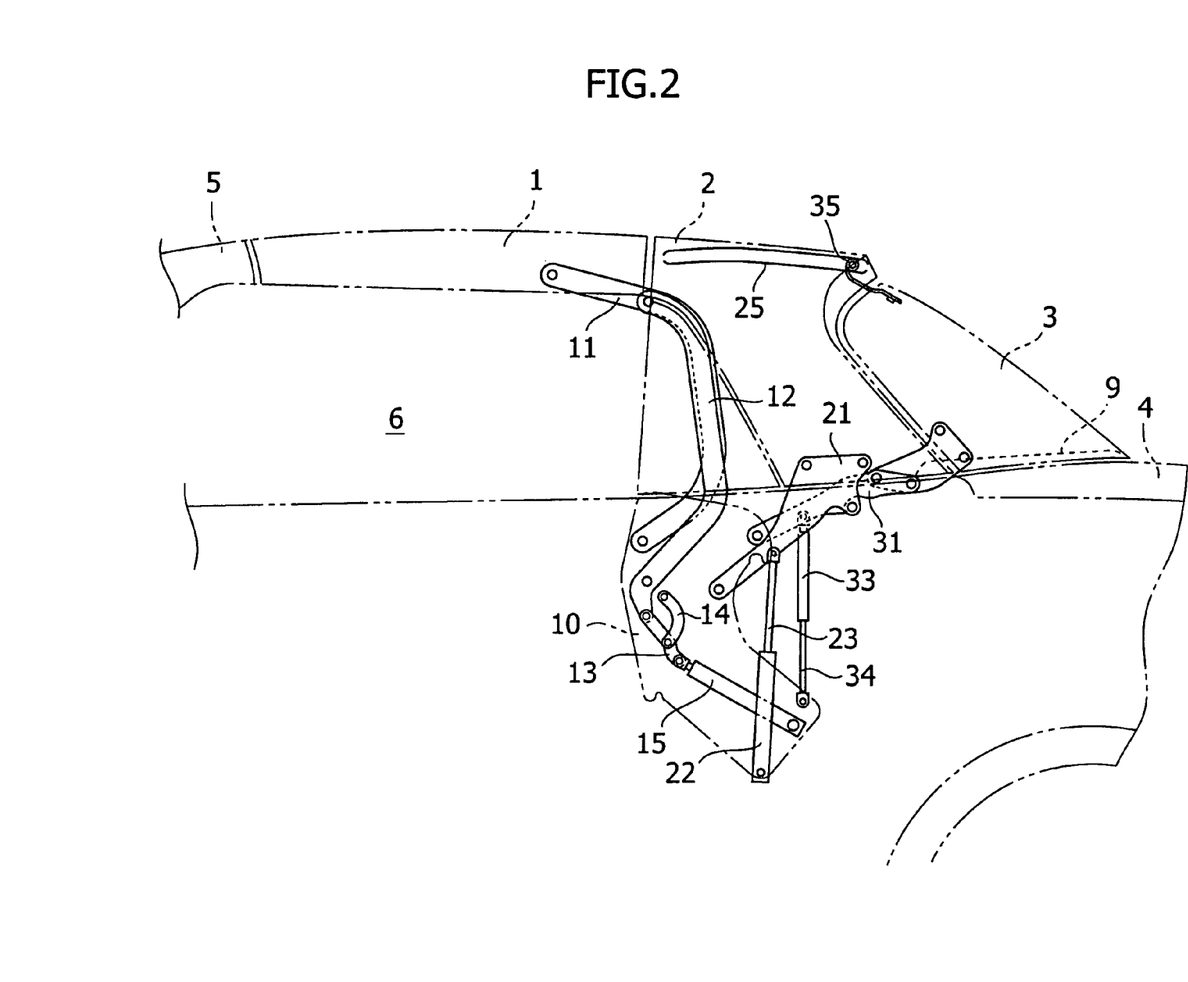
FIG. 2 is a side view of a roof storage mechanism for a vehicle in accordance with an embodiment of the present invention.

The roof storage mechanism for the center roof section 1, the rear roof section 2, and the back window section 3 is provided in a pair at the right and left on common base plates 10 arranged in both side parts of the roof storage section 8. The center roof section 1 is turnably connected to the tip end parts of a control arm 11 and a drive arm 12 which are pivotally supported on the base plate 10. The center roof section 1, the control arm 11, the drive arm 12, and the base plate 10 form a four link mechanism.

To the other end part of the drive arm 12, an actuator 15 consisting of a fluid pressure cylinder etc. is connected via a link arm 13, and the actuator 15 is swingably supported on the base plate 10. To the link arm 13, a link control arm 14 is connected. The link arm 13, the link control arm 14, and a lever 12c form a four link mechanism, so that the linear reciprocating motion of the actuator 15 is transmitted efficiently in a wide revolution angle range of the drive arm 12.

To the lower end part of the rear roof section 2, a rear roof arm 21 is fixed, and the rear roof arm 21 is pivotally supported on the base plate 10. To the rear roof arm 21, an actuator 22 is connected, and the actuator 22 is swingably supported on the base plate 10. In place of the installation of the actuator 22, the configuration may be such that the rear roof arm 21 and the drive arm 12 of the center roof section 1 are connected to each other via a link mechanism to link the rear roof arm 21 to the drive arm 12.

To the lower end part of the back window section 3, a back window arm 31 is fixed, and the back window arm 31 is pivotally supported on the base plate 10 so as to be movable. Also, to the upper end part of the back window section 3, an upper arm 36 extending to the rear roof section 2 side is fixed, and in the tip end part of the upper arm 36, a roller 35 is rotatably provided. The roller 35 engages with the rear roof section 2 so as to be movable along a guide rail 25 fixed to the rear roof section 2, so that the back window section 3 moves definitely according to the movement of the rear roof section 2. On the back window arm 31, a gas pressure type balancer 33 for balancing the weight of the back window section 3 with the pressure of a filler gas is pivotally supported, and the tip end of the balancer 33 is connected to the base plate 10.

The opening/closing operation of the center roof section 1, the rear roof section 2, and the back window section 3 configured as described above is explained with reference to FIGS. 2 to 4.

In the roof closed state shown in FIG. 2, the center roof section 1 is being locked to the front window frame 5 by a lock mechanism, not shown, the rod of the actuator 15 is being shortened, and the rod of the actuator 22 is being extended. The rod of the balancer 33 is also being extended. The roller 35 is located in the rear end part in the vehicle front and rear direction of the guide rail 25.

Figure 3:
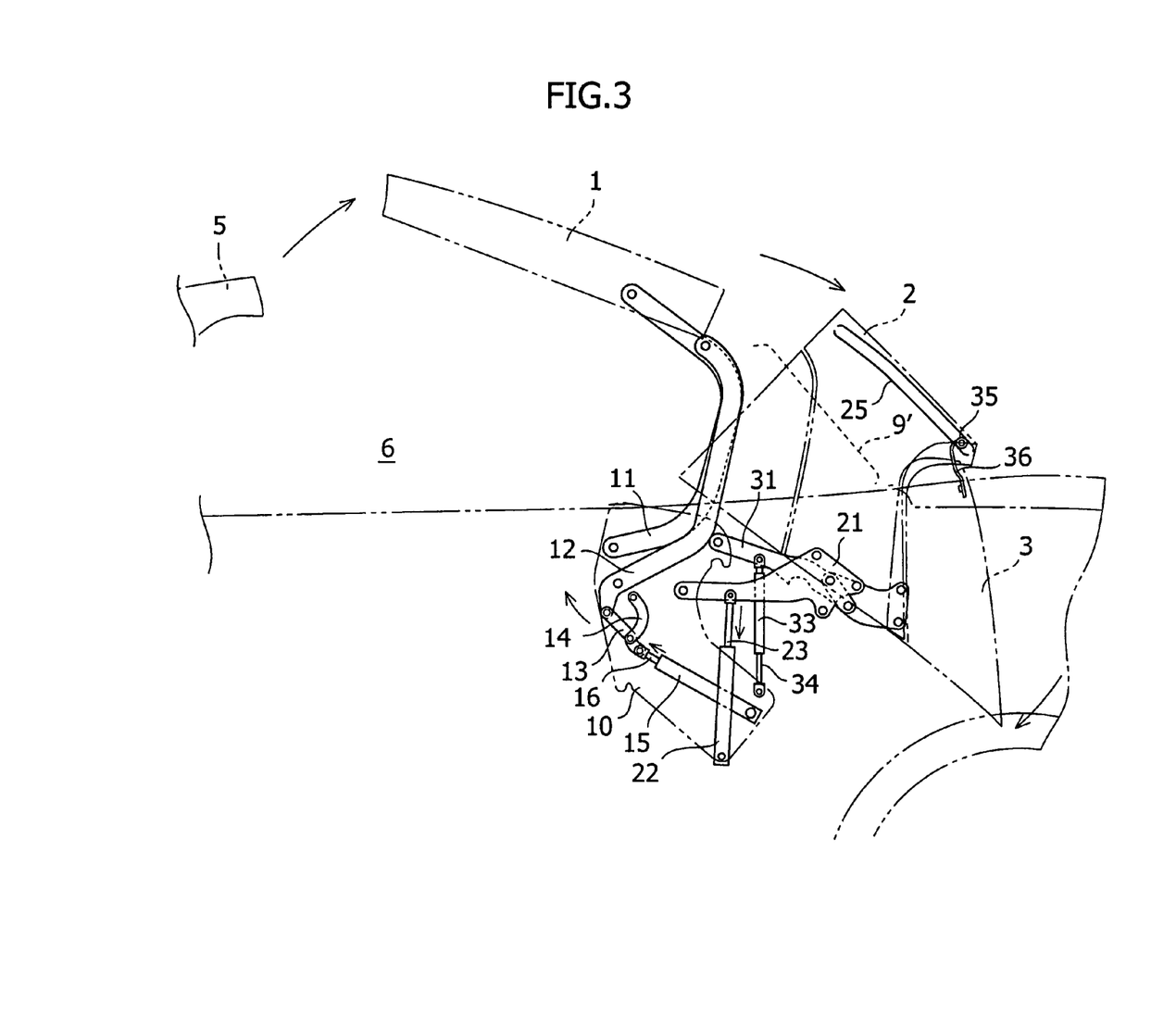
FIG. 3 is a side view showing a roof storage operation of a vehicle in accordance with an embodiment of the present invention.

From this state, as shown in FIG. 3, the rod of the actuator 22 is shortened to move the rear roof section 2 to the rear of vehicle together with the rear roof arm 21. Thereby, the back window section 3 connected to the rear roof section 2 via the roller 35 and the guide rail 25 also moves to the rear of vehicle. Successively, the rod of the actuator 15 is extended to revolute the drive arm 12, and thereby the center roof section 1 moves to the rear of vehicle.

When the back window section 3 reaches the storage position thereof, the back window section 3 cannot keep the same positional relationship against the further revolution of the rear roof section 2 because the revolution radius of the back window section 3 is shorter than that of the rear roof section 2. Therefore, the roller 35 begins to move along the guide rail 25, the back window section 3 shifts to the front of the rear roof section 2, and the rear roof section 2 further moves downward at the rear of the back window section 3. Finally, in the state in which the rear roof section 2 and the back window section 3 are stored, the roller 35 reaches the end part of the guide rail 25.

Figure 4:
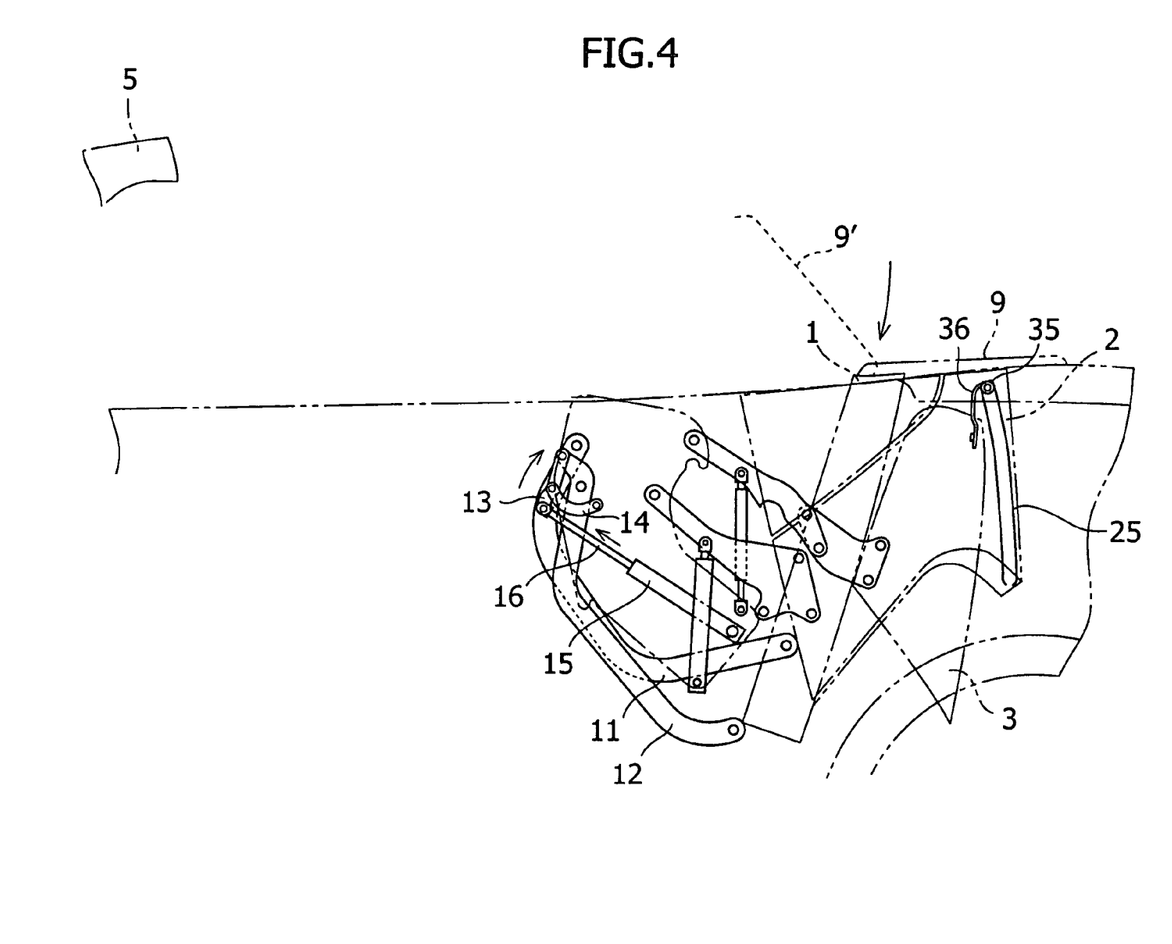
FIG. 4 is a side view showing a roof storage state of a vehicle in accordance with an embodiment of the present invention.

When the rod of the actuator 15 is further extended, as shown in FIG. 4, the center roof section 1 is stored in front of the back window section 3. In such an open-top state, the rear roof section 2, the back window section 3, and the center roof section 1 are stored in a lapped manner in a substantially upright state in the named order from the rear of vehicle in the roof storage area 8 formed between the rearmost seat 7 and the luggage compartment 4 in the rear part of vehicle. When the roof is returned to the closed state, an operation reverse to the above is performed. Also, a targa-top state can be formed by restoring only the rear roof section 2 and the back window section 3 to the original positions from the storage state.

Next, the tonneau cover 9 for opening and closing the upper part of the roof storage area 8 and the opening/closing mechanism thereof are explained in detail with reference to FIGS. 5 to 11.

Figure 5:
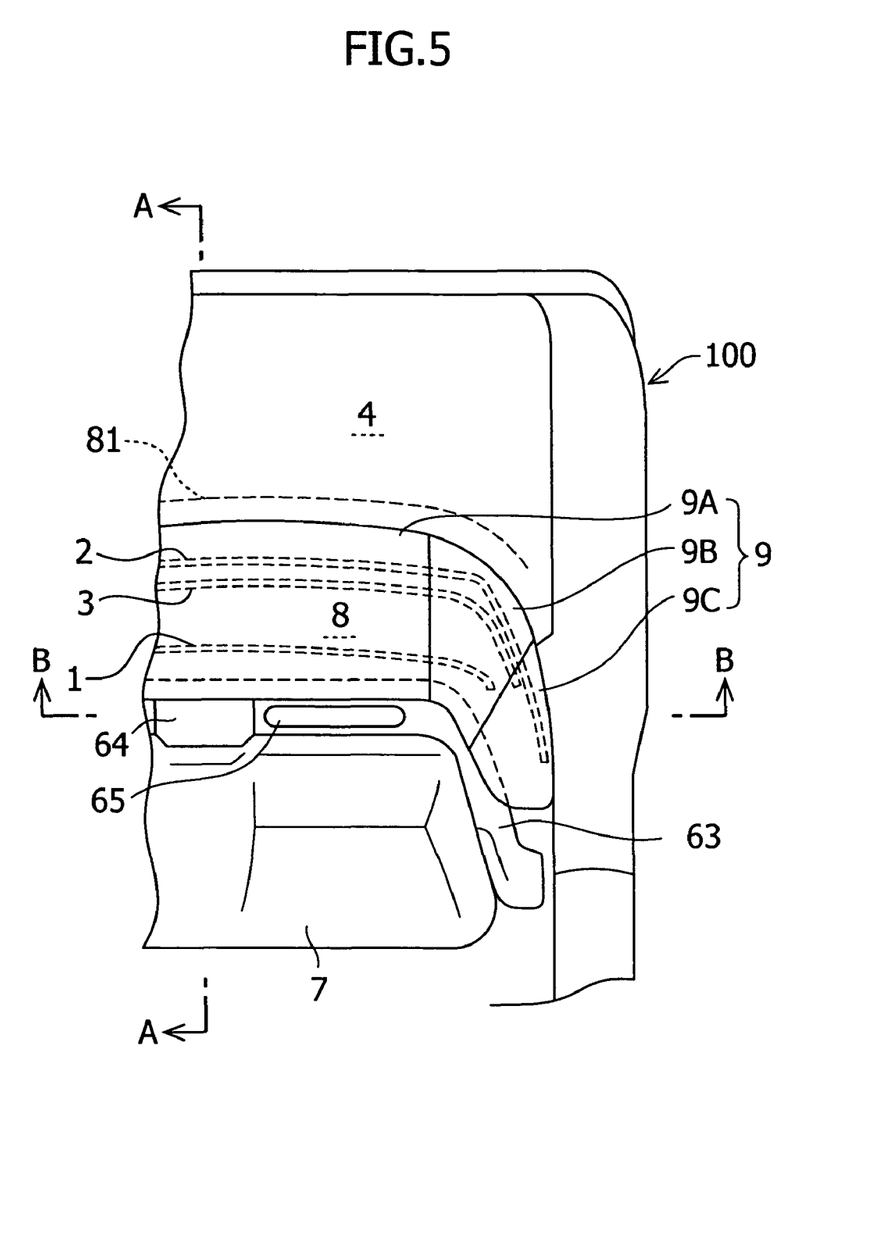
FIG. 5 is a plan view of an essential portion, showing a roof storage state of a vehicle in accordance with an embodiment of the present invention.
Figure 6:
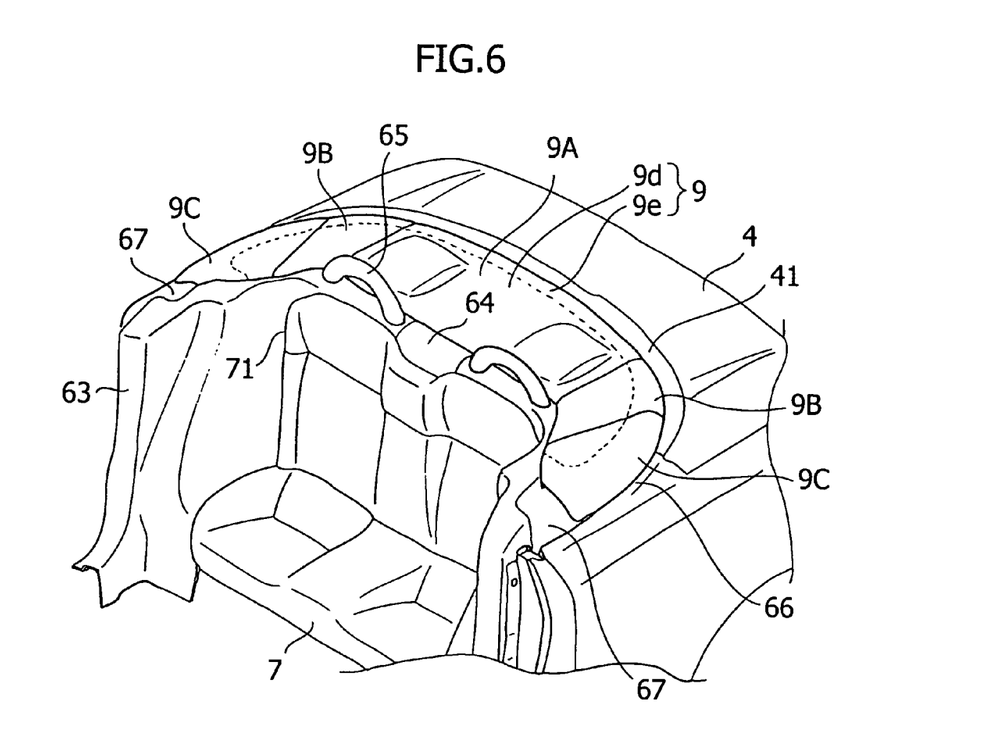
FIG. 6 is a perspective view showing the vicinity of a tonneau cover in a roof storage state of a vehicle in accordance with an embodiment of the present invention.
Figure 7:
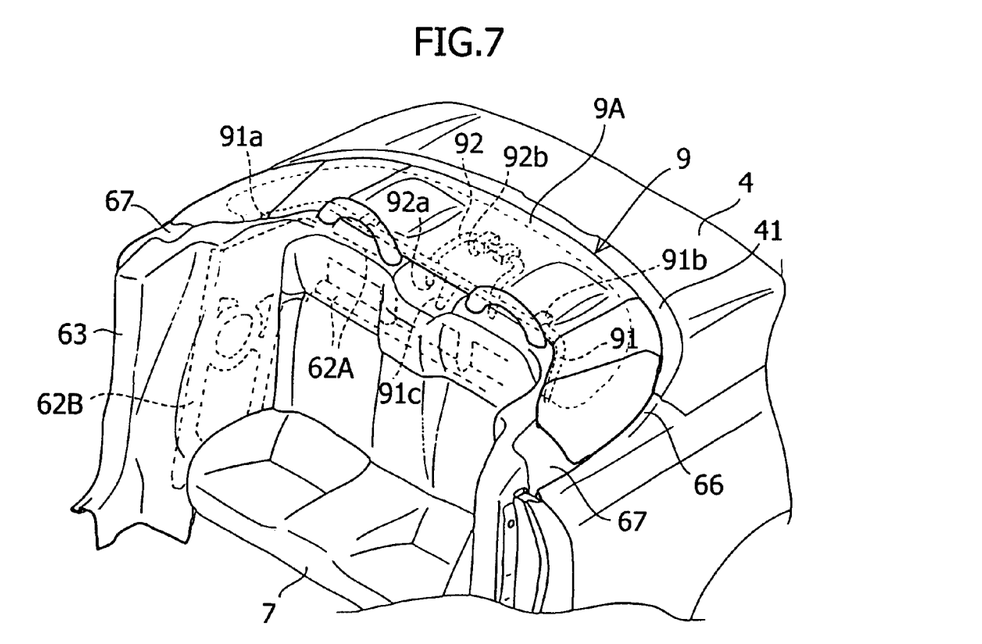
FIG. 7 is a perspective view showing a reinforcing frame structure and a tonneau cover swing mechanism for a roof retractable type vehicle in accordance with an embodiment of the present invention.

FIGS. 5 to 7 are a plan view and perspective views showing the state in which the roof of the vehicle 100 is stored and the tonneau cover 9 is closed. In these figures, the tonneau cover 9 is provided so as to be openable and closable in the upper part of the roof storage area 8 spreading between the rear seat 7 and the luggage compartment 4 positioned at the rear of the rear seat 7, and, in the closed state, the tonneau cover 9 is positioned substantially horizontally at almost the same height as that of the upper end of a seat back 71 of the rear seat 7.

Figures 9A, 9B:
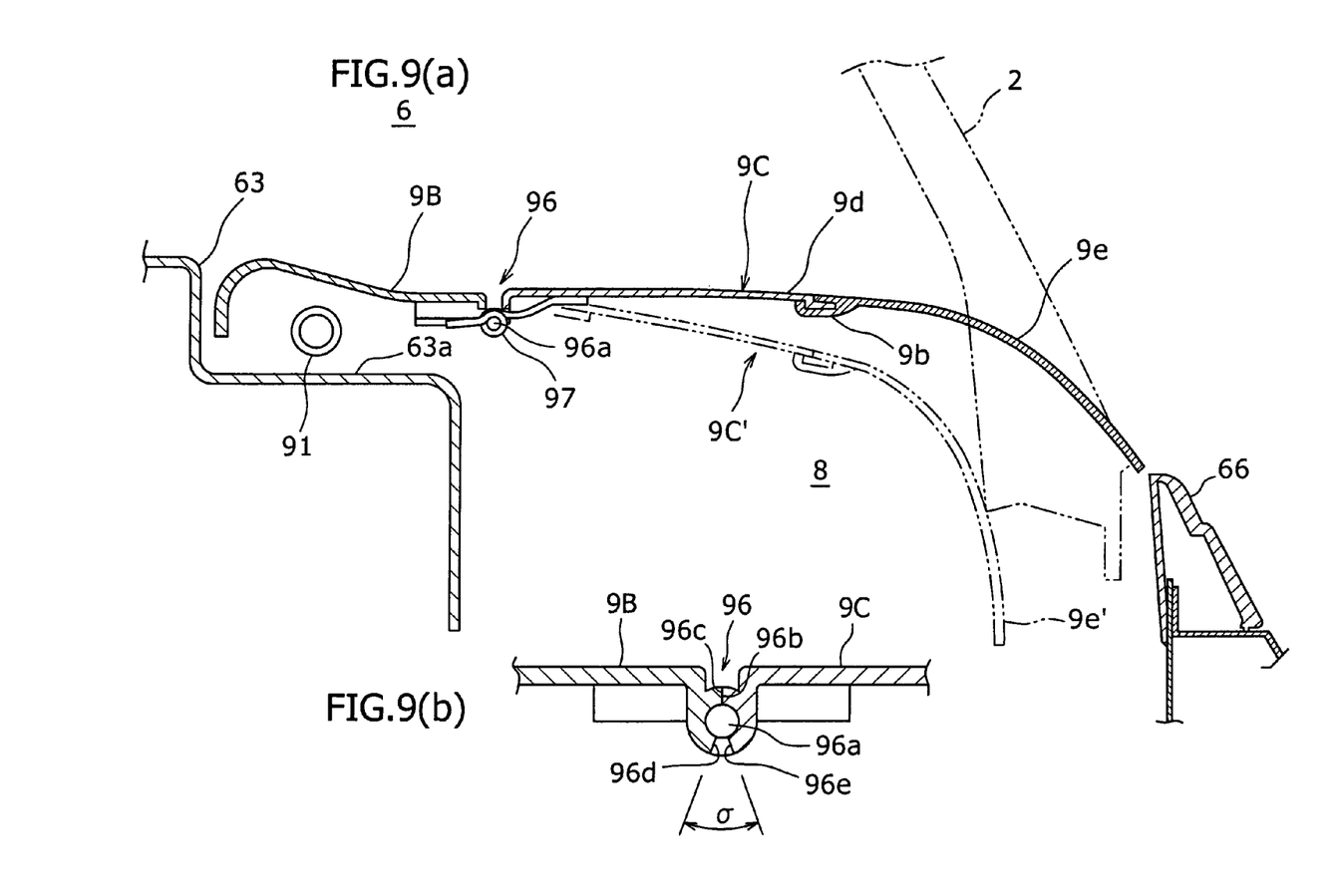
FIG. 9A is sectional view taken along the line B-B of FIG. 5 in a tonneau cover closed state.
FIG. 9B is an enlarged sectional view of an essential portion at a position shifting in the drawing thickness direction (depth direction)

In a portion ranging from the rear to the sides of the rear seat 7, a frame structure 62 is provided so as to surround the rear seat 7 from the rear side. The surface of the frame structure 62 is covered with a trim 63 (interior trim material). This trim 63 defines the edge part on the vehicle front side of the upper opening of the roof storage area 8. In this embodiment, a step part 63a (refer to FIGS. 5 and 9) is formed in the edge part on the vehicle rear side of the upper surface of the trim 63, and the front edge part (the edge part on the vehicle front side) of the tonneau cover 9 is positioned so as to enter into the step part 63a in the closed state.

On the other hand, the edge part ranging from the rear to the sides of the upper opening of the roof storage area 8 is defined by a garnish 41 extendingly provided along the edge end part on the vehicle front side of a trunk lid and a garnish 66 extendingly provided at the upper end of a vehicle body side panel. In the closed state, the rear edge part (the edge part ranging from the rear to the sides of vehicle) of the tonneau cover 9 is jointed to a seal member, not shown, mounted on the garnishes 41 and 66.

The tonneau cover 9 is made up of three members of a central member 9A positioned in the center in the vehicle width direction and side members (9B, 9C) adjacent to both sides of the central member 9A, and in this embodiment, each of the side members is divided into two side members 9B and 9C. That is to say, the tonneau cover 9 is made up of five members in total on both right and left sides. Whereas the central member 9A extends in the vehicle width direction at the rear of the rear seat 7, the side members 9B and 9C positioned on both sides extend so as to pass around the side of the rear seat 7. Between the edge end part on the vehicle front side of the outermost side member 9C and the trim 63, an opening 67 is defined so that the control arm 11 and the drive arm 12 of the center roof section 1, which revolute upward in the roof closed state shown in FIG. 2, are inserted therethrough.

Figure 8:
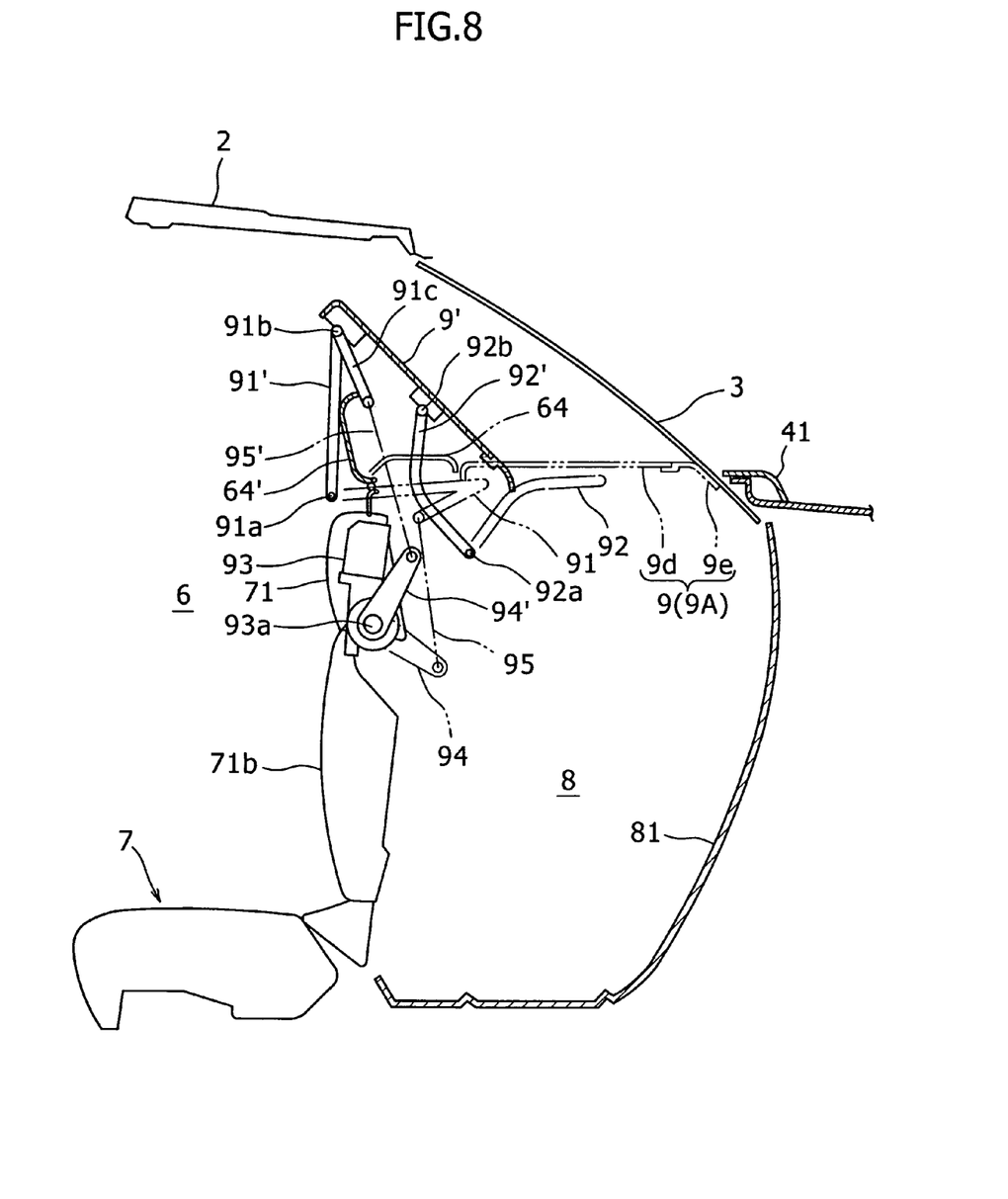
FIG. 8 is a sectional view taken along the line A-A of FIG. 5, showing the swing mechanism and the retracting operation of a tonneau cover.

As shown in FIGS. 7 and 8, the central member 9A of the tonneau cover 9 is swingably connected to the frame structure 62 via a front link 91 and a rear link 92 at two positions separated in the vehicle front and rear direction, and the front and rear links 91 and 92 and the central member 9A form a four link mechanism in which the vehicle body side (the frame structure 62) is a fixed link. The side members 9B are bendably connected to both sides of the central member 9A, and the side members 9C are bendably connected to the other sides of the side members 9B, so that the whole of the tonneau cover 9 can be moved in the vehicle front and rear direction and also the side members 9B and 9C can be pulled in to the center side in the vehicle width direction. The bending mechanism for the side members 9B and 9C is described later.

One end 91a of the front link 91 is turnably connected to the frame structure 62 at the side of the rear seat 7, and the other end 91b of the front link 91 is turnably connected to the back side of the front end part of the central member 9A of the tonneau cover 9. The front link 91 on the right and left sides is formed by one member that forms a turning axis extending in the vehicle width direction at the other end 91b and is connected integrally.

One end 92a of the rear link 92 is turnably connected to the frame structure 62 at the rear of the rear seat 7, and the other end 92b of the rear link 92 is turnably connected to the back side of the central part of the central member 9A of the tonneau cover 9. Like the front link 91, the rear link 92 is formed by one member that forms a turning axis extending in the vehicle width direction at the other end 92b on the right and left sides and is connected integrally. Comparing with the front link 91, the rear link 92 has a small space at the right and left and is arranged near the center in the vehicle width direction.

As shown in FIG. 8, the turn end 91a on the vehicle body side of the front link 91 is disposed at almost the same height position as that of the upper opening of the roof storage area 8, and the front link 91 is brought down to a posture close to the horizontality in the closed state of the tonneau cover 9. On the other hand, the turn end 92a on the vehicle body side of the rear link 92 is disposed below the turn end 91a of the front link 91 for the reason described later.

The rear link 92 is bent in the middle part thereof, and is made up of a part that rises slantwise from the turn end 92a on the vehicle body side toward the middle part in the closed state of the tonneau cover 9 and a part that extends from the middle part to the other end 92b and is brought down to the horizontality along the back surface of the tonneau cover 9 in the closed state of the tonneau cover 9. Thereby, the projection of the rear link 92 into the roof storage area 8 is restrained. In particular, comparing with the front link 91, the rear link 92 is configured so that the rear link 92 is positioned on the rear side of vehicle, the rear link 92 brought close to the stored roof sections has a small space at the right and left, and the rear link 92 is arranged near the center in the vehicle width direction. Thereby, an advantage that a space produced by the storage posture of roof sections (curved shape of roof sections) can be utilized effectively and the storage space can be formed so as to be small is provided.

The central member 9A of the tonneau cover 9, which is swingably supported via the front and rear links 91 and 92 as described above, is reciprocatingly driven by a driving means connected to the front link 91. As shown in FIG. 8, the driving means includes a motor 93, which is a driving source, a speed reducing gear train (not shown) such as a worm gear for transmitting the rotation of the output shaft of the motor 93 to a driving shaft 93a, a drive arm 94 fixed to the driving shaft 93a, and a drive link 95 that turnably connects the tip end part of the drive arm 94 to an arm part 91c of the front link 91.

The arm part 91c is rigidly connected to the central part of the turning axis (91b) extending in the vehicle width direction of the front link 91, and can turn integrally with the front link 91. In the closed state of the tonneau cover 9 indicated by the two-dot chain line in FIG. 8, the arm part 91c projects from the turning axis (91b) to the front side of vehicle. As the driving source, in addition to the electric motor, a rotary motion actuator or a linear motion actuator such as a fluid pressure cylinder can be used. In the case where the linear motion actuator is used, the output rod thereof should be connected to the arm part 91c of the front link 91 or the drive arm 94.

The motor 93, which forms the driving means for the front link 91, is fixed to the frame structure 62 that swingably supports the front and rear links 91 and 92. As shown in FIG. 7, the frame structure 62 is made up of a pair of right and left side frames 62B that are fixed to a vehicle body floor at both sides of the rear seat 7 and rise from those portions and a transverse frame 62A that is rigidly connected to the rear upper parts of the side frames 62B and extends in the vehicle width direction on the rear side of the rear seat 7. The frame structure 62 has a portal rigid construction as a whole, and is formed substantially into a U shape that is open to the vehicle front side as viewed from the top.

At the positions corresponding to the right and left seats of the rear seat 7 of the transverse frame 62A, roll bars 65 for protecting passengers are rigidly provided. The base parts of the roll bar 65 is covered with the trim 63, and the upper half part thereof formed into an inverse U shape projects upward beyond the trim 63. In a middle part between the right and left roll bars 65, a lid 64 forming the upper surface of the trim 63 is provided so as to be openable and closable. The lid 64 is pivotally supported on the trim 63 or the frame structure 62 around the axis of the front edge part thereof, and is urged toward the closing direction by an urging member (spring), not shown.

The motor 93 (and the gear case for the speed reducing gear train) is fixed to the central part of the transverse frame 62A of the frame structure 62 configured as described above, and the turn end 92a on the vehicle body side of the rear link 92 is pivotally supported on the surface on the vehicle rear side of the transverse frame 62A. Also, the turn end 91a on the vehicle body side of the front link 91 is pivotally supported on the upper end parts of the side frames 62B. That is to say, both of the front and rear links 91 and 92 that swingably support the central member 9A of the tonneau cover 9 and the driving means (93) are provided on the highly rigid frame structure 62. Further, since a driving force is transmitted to the central part in the vehicle width direction of the front link 91, the driving force can be applied to the whole of the tonneau cover 9 in a well balanced manner, so that a problem of torsion etc. of the front and rear links 91 and 92 and the tonneau cover 9 can be avoided.

Next, the retracting operation of the tonneau cover 9 is explained with reference to FIG. 8.

At the closed position indicated by the two-dot chain line in FIG. 8, the tonneau cover 9 (the central member 9A) is arranged in a substantially horizontal posture in the upper part of the roof storage area 8 to close the upper opening of the roof storage area 8. Also, the front and rear links 91 and 92 are brought down to the vehicle rear side from the turn ends 91a and 92a on the vehicle body side, the drive arm 94 is located in a rear lower part, and the lid 64 is closed.

When the drive arm 94 is rotated about 90 degrees upward from the above-described state by operating the motor 93, the arm part 91c of the front link 91 connected to the drive arm 94 via the drive link 95 is pushed up, and the front link 91 is rotated upward and becomes in a substantially upright state denoted by reference numeral 91' in FIG. 8. At the same time, the rear link 92 connected to the front link 91 via the central member 9A revolves frontward to a position denoted by reference numeral 92' in FIG. 8.

By the above-described operation of the front and rear links 91 and 92, the front end of the tonneau cover 9 moves upward and frontward from the closed position, and at the same time, the rear end thereof moves to the front. Thereby, as indicated by the solid line 9' in FIG. 8, the tonneau cover 9 is retracted in an inclined posture to the vehicle front side of the roof storage area 8, and therefore the upper part of the roof storage area 8 is opened. At this time, the lid 64 is pushed up and opened by the arm part 91c of the front link 91, and the rear link 92 enters into the opened portion. When the tonneau cover 9 is returned to the original closed position, the motor 93 is rotated in the reverse direction.

The front link 91 utilizes the revolution range of about 90 degrees from the substantially horizontal state to the substantially vertical state as viewed from the side between the closed position and the open position of the tonneau cover 9, so that the front end of the tonneau cover 9 can be moved upward efficiently. The rear link 92 also revolves about 85 degrees in the same manner. However, the revolution range is different. The turn end 92a on the vehicle body side of the rear link 92 is positioned below the turn end 91a on the vehicle body side of the front link 91, and utilizes the revolution range from a state of being inclined about 25 degrees upward to a state of being inclined about 20 degrees frontward beyond the vertical state as viewed from the side between the closed position and the open position of the tonneau cover 9. The rear end of the tonneau cover 9 is moved to the front in a state of being kept at a low position, by which the tonneau cover 9 is retracted through the upper opening of the roof storage area 8.

Thus, the tonneau cover 9 is retracted in an inclined posture along the movement path of roof sections by utilizing the revolution ranges differing between the front and rear links 91 and 92. Thereby, the forward movement of the front end of the tonneau cover 9 is made small though the rear end of the tonneau cover 9 is retracted completely. Therefore, the projection to the rear seat 7 side and the interference with the head of passenger caused by the projection can be restrained, and the tonneau cover 9 can be retracted efficiently from the movement path of roof.

Next, the bending mechanism for the side members 9B and 9C of the tonneau cover 9 with respect to the central member 9A thereof is explained.

As shown in FIGS. 5 and 6, the central member 9A of the tonneau cover 9 and the side members 9B adjacent to both sides thereof are divided from each other by a straight division line extending in the vehicle front and rear direction in the vicinity of the side end of the rear seat 7, and these members are bendably connected to each other in that portion. The side member 9B extends slantwise frontward from the central member 9A so as to pass around the side of the rear seat 7. On the vehicle of this embodiment, the side member 9B is further divided into the side member 9B and the side member 9C by a division line extending in the slantwise direction directed to the rear outside of vehicle in the vicinity of a middle portion between the aforementioned division position and the side end of the tonneau cover 9. The side members 9B and 9C are bendably connected to each other in the division portion. The above-described "division" includes undivided bendable connection attained by an integral hinge etc.

FIG. 9A is a sectional view in the vehicle width direction, showing a connecting part between the side member 9B and the side member 9C, and FIG. 9B is an enlarged view of a cross section shifting in the paper thickness direction from the cross section of FIG. 9A. In these figures, the side member 9B and the side member 9C are turnably connected to each other by a hinge part 96 formed integrally with the end edge parts of these members in the state in which the turning range is regulated, and the side members 9B and 9C are urged by a spring 97 mounted on a axis 96a of the hinge part 96 in the direction such that the bend is straightened.

Specifically, as shown in FIG. 9B, in the hinge part of the side member 9B and the side member 9C, stopper surfaces 96b and 96c that come into contact with each other in the maximum straightening state in which the side members 9B and 9C form a flat tonneau cover upper surface and stopper surfaces 96d and 96e that come into contact with each other in the maximum bending state are formed, by which the turning of the hinge part 96 is regulated to a range of angle δ. Further, as shown in FIG. 9A, the end parts of the spring 97 come into contact with the back surfaces of the side member 9B and the side member 9C, by which the side member 9B and the side member 9C are urged in the direction such that the stopper surfaces 96b and 96c come into contact with each other. The connecting part between the central member 9A and the side member 9B of the tonneau cover 9 also has the same configuration, so that the explanation thereof is omitted.

Figure 10:
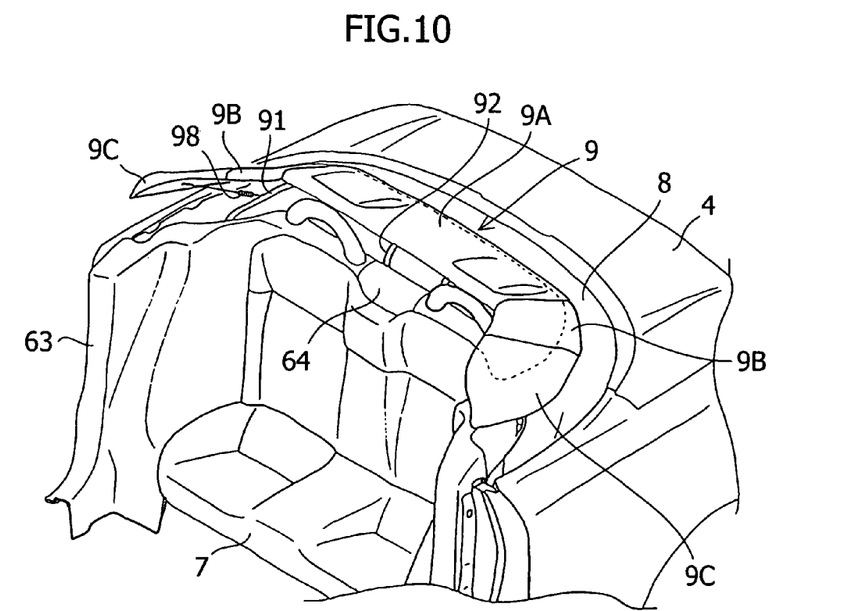
FIG. 10 is a perspective view showing a retracting operation of a tonneau cover on a roof retractable type vehicle in accordance with an embodiment of the present invention.

Further, as shown in FIGS. 9 and 10, the back surface of the side member 9C on the outside of the tonneau cover 9 and the middle part of the turn ends 91a and 91b of the front link 91 are connected to each other by a connecting member 98, so that the side member 9B is bent with respect to the central member 91 in association with the revolution of the front link 91, that is, the storage operation of the tonneau cover 9, and at the same time, the side member 9C is bent with respect to the side member 9B, by which the side members 9B and 9C are retracted to the center side in the vehicle width direction.

As the connecting member 98, a rod etc. having no flexibility can be used. In this embodiment, however, since the connecting member 98 is subjected to only a tensile force, a linear, string-shaped, or band-shaped member having flexibility, or a bendable member such as a link or a chain can be used suitably. Further, in the example shown in the figures, a tension spring is provided in the middle part of the connecting member 98, so that the connecting member 98 has elasticity. The elasticity of the connecting member 98 offers an advantage that adjustment of turning regulation in the hinge part 96 is not needed. The connecting member 98 may be configured by the tension spring over the total length, and also a rubber band can be used in place of the tension spring. Also, by making the spring constants of springs 97 in the inner and outer hinge parts different, the bending timing of the side members 9B and 9C on each side can be made different.

Next, the operation of the tonneau cover bending mechanism configured as described above is explained with reference to FIGS. 6 to 11.

In the state in which the tonneau cover 9 closes the upper part of the roof storage area 8, as shown in FIGS. 7 and 8, the front link 91 is brought down substantially to the horizontality along the back surface of the tonneau cover 9, and the front link 91 is located close to the side member 9C. Therefore, the connecting member 98 that connects the front link 91 to the side member 9C loosens, and the side members 9B and 9C are straightened into the maximum straightening state by the urging of the spring 97 provided in the hinge part 96.

Figure 11:
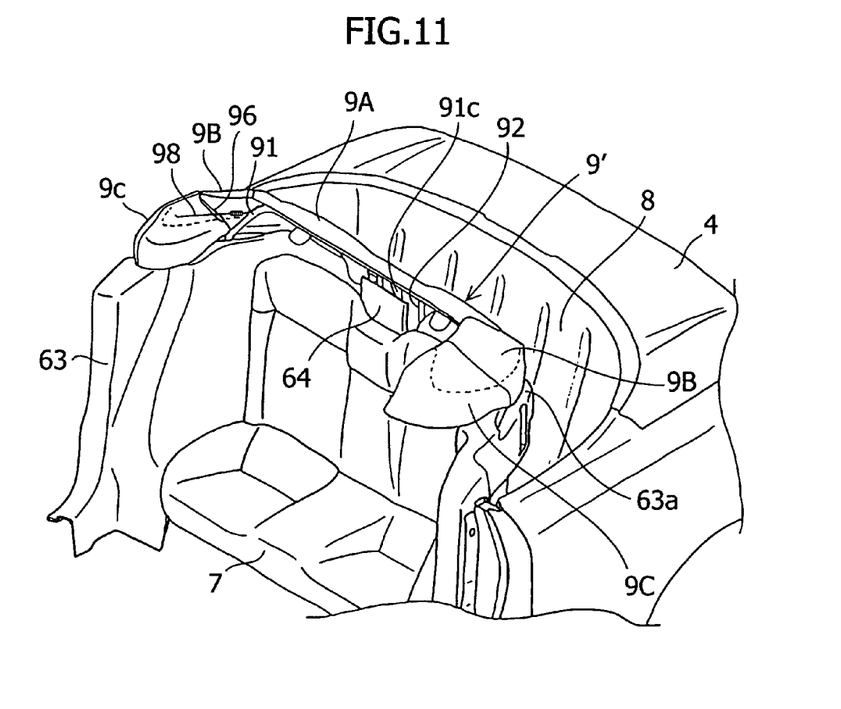
FIG. 11 is a perspective view showing a retracting operation of a tonneau cover on a roof retractable type vehicle in accordance with an embodiment of the present invention.

When the front link 91 begins to be revolved upward by the aforementioned driving means from the above-described state, the front link 91 and the tonneau cover 9 begin to rotate relatively, and the front link 91 and the side member 9C begin to separate from each other. Then, as shown in FIGS. 10 and 11, the connecting member 98 is tightened, and the side member 9C is pulled by the connecting member 98. Thereby, the side members 9C and 9B are bent to the regulation position of the turning range in the hinge part against the urging force of the spring 97. After the turning of the hinge part of the side members 9C and 9B has reached the regulation position, the side member 9C becomes unable to be bent further. The tension spring extends to absorb an over stroke, by which the hinge part 96 of the tonneau cover 9 can be prevented from being subjected to an excessive force.

At this time, in the connecting part between the side member 9C and the side member 9B, since the axis 96a of the hinge part 96 is disposed slantwise toward the rear outside of vehicle, in an inclined posture in which the tonneau cover 9 is retracted from the closed position, the width on the upper end side of the tonneau cover 9 is narrow, so that tonneau cover 9 can be retracted along the inner surface shape of roof from the roof movement path with a small displacement.

Also, to define the revolution range of roof storage mechanism disposed at the side of vehicle, the side members 9B and 9C of the tonneau cover 9 are extended to the front of vehicle with respect to the central member 9A. In the above-described inclined posture, the tip end position of the side member 9C is lowered by the bending of the side members 9B and 9C, so that the interference with the roof movement path can be avoided. At this time, whereas the vehicle front side of the side member 9C moves downward, the vehicle rear side of the side member 9C is close to the axis 96a of the hinge part 96, and the lowering amount is small. Therefore, in the early stage of opening operation of the tonneau cover 9, even in the state in which the inclination of the central member 9A is still small, the side member 9C can begin to be bent. The bent side members 9B and 9C are straightened by the urging force of the spring 97 as the front link 91 is brought close to the side member 9C and the connecting member 98 is loosened by the operation of restoring the tonneau cover 9 to the closed position.

In the above-described embodiment, the case where the tonneau cover 9 is divided into five members of the central member 9A and the side members 9B and 9C, and these members are connected bendably has been described. However, in some cases, the tonneau cover is configured by three members of a central member and side members depending on the division shape and storage form of roof. Also, in this embodiment, the passenger compartment space is influenced at the time of retraction. To solve this problem, by utilizing the opening above the door, the tonneau cover can be configured by one member without being divided.

The materials of the central member 9A and the side members 9B and 9C of the tonneau cover 9 are not subject to any special restriction. A hard material that is not deformed reversibly, a soft material that can be deformed reversibly, and a flexible and elastic material can be used appropriately. However, the use of a soft material such as elastomer in peripheral edge parts 9e of the central member 9A and the side members 9B and 9C of the tonneau cover 9 is less preferred in terms of appearance because the displacement of the hinge part 96 when closing the roof is small. In this case, a hard and lightweight resin material is preferably used in a main part 9d other than the peripheral edge part 9e to prevent deformation at the time of movement of the tonneau cover 9.

Also, in the above-described embodiment, the case where the side members 9B and 9C of the tonneau cover 9 are connected so as to be bendable with respect to the central member 9A by the hinge part 96, that is, connected so as to be turnable around the axis along the division line has been described. However, the configuration may be such that the side members are connected so as to be turnable around the axis perpendicular to the plane of the tonneau cover with respect to the central member, or the side members are connected so as to be slidable with respect to the central member, by which the side members can be retracted to the lower side or the inside of the central member.

Also, in the above-described embodiment, the case where the central member 9A of the tonneau cover 9 is swingably connected by the front link 91 and the rear link 92 forming the four link mechanism, by which the front end of the tonneau cover 9 is moved frontward and upward from the closed position, and also the operation of moving the rear end of the tonneau cover 9 frontward is decided and the tonneau cover 9 is retracted in an inclined posture has been described. However, the present invention is not limited to this case, and embraces the case where the similar deciding operation is carried out by another possible mechanism. For example, a linear motion actuator swingably connected to the vehicle body side is provided in place of the front link 91 and the motor 93, the output rod of the linear motion actuator is turnably connected to the front end of the tonneau cover 9, and the output rod is operated to advance or retreat, by which the similar deciding operation can be realized.

Also, the driving means (93) for the tonneau cover 9 may be provided in both side parts in the vehicle width direction of the frame structure 62 (both side parts of the transverse frame 62A or side frames 62B) in place of the central part of the frame structure 62. In this case, as the driving means on each side, in addition to the configuration in which the motor and the link mechanism are provided as in the case where the driving means is provided in the central part, a configuration in which the turning axis support part (91a or 92a) of the front link 91 (or the rear link 92) is driven by a gear and a motor, a configuration in which a fluid pressure actuator is provided on each side, or the like configuration can be adopted. If the power source on each side is separate, although the need for synchronization arises, an advantage that the spatial restriction in the seat center is little and power can be transmitted surely to the turning axis support part on each side or the vicinity thereof is provided.

Also, in the above-described embodiment, the case where the roof is stored in the storage area 8 at the rear of the rear seat 7 by being divided into three sections has been described. However, the present invention is not limited to this case. The roof retractable type vehicle in accordance with the present invention may have another roof storage system. For example, the present invention can be carried out for a hardtop type vehicle in which the roof is stored in the vehicle body by being divided into two sections, a soft-top type vehicle in which the roof is stored by being folded, and the like vehicles.

The above is a description of an embodiment of the present invention. The present invention is not limited to the above-described embodiment, and can be modified and changed variously based on the technical concept of the present invention.

What is claimed is:

1. A roof retractable type vehicle comprising:
    a roof storage area defined at the rear of a seat;
    a roof storage mechanism for storing a roof in the roof storage area; and
    a tonneau cover for opening and closing an upper part of the roof storage area, wherein
    the tonneau cover includes a central member positioned in the center in a vehicle width direction and side members adjacent to both sides of the central member, said central member includes a front end and a rear end;
    the central member is swingably connected to the vehicle body side via links at two positions separated in a vehicle front and rear direction; front and rear links on each side and the central member form a four link mechanism in which a vehicle body side is a fixed link; and a pivot axis on the vehicle body side of the front link is disposed at a position higher than a pivot axis on the vehicle body side of the rear link;
    each of the side members is connected turnably or slidably to the central member, and is connected to the front link or the vehicle body side via a connecting member; and
    the tonneau cover is configured to be retracted to the front from a closed position so as to open the upper part of the roof storage area in an inclined posture by an operation in which the front end of the central member moves frontward and upward from the closed position and the rear end of the central member moves frontward and thereby the side member is retracted towards a vehicle center side in the vehicle width direction.

2. The roof retractable type vehicle according to claim 1, wherein the side members of the tonneau cover are turnably connected to the central member along a division line, and the turning axis is disposed slantwise so that the front end in the vehicle front and rear direction is positioned on the vehicle center side of the rear end.

3. The roof retractable type vehicle according to claim 1, wherein the tonneau cover includes an urging member for urging the side member in a retracting direction and an opposite direction thereto with respect to the central member and a device for regulating a turning range of the side member against the urging force of the urging member.

4. The roof retractable type vehicle according to claim 1, wherein a frame structure extendingly provided in the vehicle width direction between the seat and the roof storage area is provided, and a device for moving the tonneau cover between the closed position and an open position is disposed in a central part in the vehicle width direction of the frame structure.

5. The roof retractable type vehicle according to claim 1, wherein a frame structure extendingly provided in the vehicle width direction between the seat and the roof storage area is provided, and a device for moving the tonneau cover between the closed position and an open position is disposed in both side parts in the vehicle width direction of the frame structure.

6. The roof retractable type vehicle according to claim 1, wherein the tonneau cover is positioned in a passenger compartment in a closed state of the roof.

* * * * *